United States Patent [19]
Seeker et al.

[11] Patent Number: 6,141,757
[45] Date of Patent: Oct. 31, 2000

[54] SECURE COMPUTER WITH BUS MONITORING SYSTEM AND METHODS

[75] Inventors: Frank Edward Seeker, Glendale; Craig Robert Fossey, Scottsdale, both of Ariz.

[73] Assignee: Motorola, Inc.

[21] Appl. No.: 09/100,956

[22] Filed: Jun. 22, 1998

[51] Int. Cl.[7] .................................................. G06F 11/00
[52] U.S. Cl. ............................................. 713/200; 714/44
[58] Field of Search ..................... 713/200, 201, 713/202; 380/3, 4, 23, 25, 33, 49; 714/5, 25, 31, 43, 44, 48

[56] References Cited

U.S. PATENT DOCUMENTS

| | | | |
|---|---|---|---|
| 5,613,075 | 3/1997 | Wade et al. | 395/287 |
| 5,632,021 | 5/1997 | Jennings et al. | 395/309 |
| 5,724,528 | 3/1998 | Kulik et al. | 395/308 |
| 5,729,767 | 3/1998 | Jones et al. | 395/882 |
| 5,740,385 | 4/1998 | Hayek et al. | 395/308 |
| 5,835,741 | 11/1998 | Elkhoury et al. | 395/309 |
| 5,864,653 | 1/1999 | Travallaei et al. | 315/181 |
| 5,896,499 | 4/1999 | McKelvey | 395/187.01 |
| 5,987,539 | 11/1999 | Goodrum | 710/55 |
| 6,009,527 | 12/1999 | Traw et al. | 713/200 |
| 6,032,271 | 2/2000 | Goodrum et al. | 714/56 |
| 6,070,253 | 5/2000 | Travallaei et al. | 714/31 |

*Primary Examiner*—Nadeem Iqbal
*Attorney, Agent, or Firm*—Walter W. Nielsen; Gregory J. Gorrie

[57] ABSTRACT

A secure computer system (100) includes a host processor (105) for communicating a datum to a trusted bus (101). A bridge (125) connects the trusted bus (101) to an untrusted bus (102). The bridge (125) conveys the datum from the trusted bus (101) to the untrusted bus (102). A bus access monitor (200) is coupled to the trusted bus (101) and the untrusted bus (102). The bus access monitor (200) performs a method (1000, FIG. 10) for securely monitoring the untrusted bus (102), and asserting an alarm signal when address information associated with the datum fails to compare with predetermined address information. Additionally, the host processor (105) performs a method (300, FIG. 3) for self-testing the bus access monitor.

24 Claims, 10 Drawing Sheets

SECURE COMPUTER WITH BUS MONITORING SYSTEM AND METHODS

FIELD OF THE INVENTION

This invention relates in general to a computer with a bus monitor and, more specifically, to a secure computer with a bus monitor.

BACKGROUND OF THE INVENTION

A typical bus for a computer has an electrical and mechanical limit to the number of devices (e.g., computer cards) the bus can support. For example, a peripheral component interconnect (PCI) bus commonly supports fewer than six devices. An apparatus for extending the bus, entitled a "bridge", allows the bus to support additional devices without loading the bus. One such example for a bridge is a PCI bridge.

A PCI bridge extends the electrical and mechanical capacity for a PCI bus. However, one limitation for a PCI bridge is that it fails to provide security protection when communicating from the "host side" to the "extended device side" of the bridge.

Another limitation for existing computer systems is the difficulty in isolating devices. For example, in a computer system having a PCI bus, devices that are coupled to the bus via a bridge have "pass through" access to data. In other words, the bridge fails to provide data isolation between the host side and the extended device side of the bus. The inability to isolate the two sides of the bus constitutes a severe limitation when operating in a secure computing environment.

For example, assume that a secure computer system has several different software programs to perform. Further assume that some of the software programs are to be performed at different security levels. When extended devices are classified at a lower security level than one of the software programs, the bridge provides no security mechanism to detect or inhibit communication of information classified at a higher level to a device classified at a lower level. Furthermore, when security protection is provided to a system, the security apparatus providing the protection needs to be self-tested to provide assurance of intended operation.

Thus, what is needed are a system and method providing security protection for communications via a bus for a computer. What is also needed are a system and method for isolating devices coupled to a computer bus. What is also needed are a system and method for detecting communication of data from one device to another device. What is also needed are a system and method for inhibiting communication of data from one device to another device. What is also needed are a system and method for self-testing a security apparatus providing security protection.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures and:

The exemplification set out herein illustrates a preferred embodiment of the invention in one form thereof, and such exemplification is not intended to be construed as limiting in any manner.

DETAILED DESCRIPTION OF THE PREFERRED EMBODIMENT

The present invention provides, among other things, a secure computer system including a host processor for communicating a datum to a trusted bus. A bridge connects the trusted bus to an untrusted bus. The bridge conveys the datum from the trusted bus to the untrusted bus. A bus access monitor is coupled to the trusted bus and the untrusted bus. The bus access monitor performs a method for securely monitoring the untrusted bus, and asserting an alarm signal when address information, associated with the datum, fails to compare with predetermined address information. Additionally, the host processor performs a method for self-testing the bus access monitor.

The present invention further provides a system and method providing security protection when communicating via a bus. Also, the present invention provides a system and method for isolating devices coupled to a bus. The present invention further provides a system and method for detecting communication of data from one device to another device. The present invention also provides a system and method for inhibiting communication of a datum from one device to another device. The present invention also provides a system and method for self-testing a security apparatus providing security protection.

Figure 1:
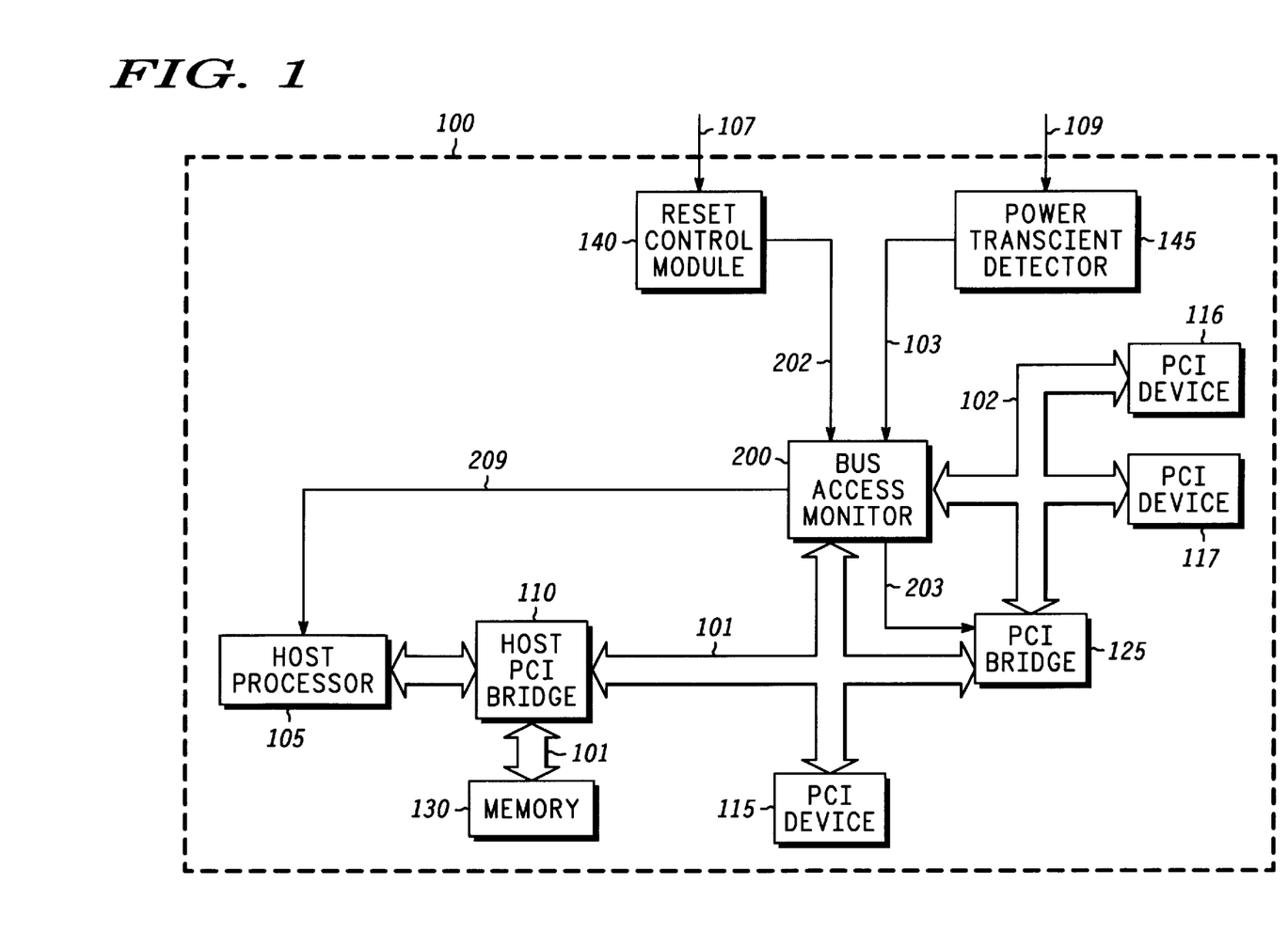
FIG. 1 shows a simplified block diagram for a secure computer system in accordance with a preferred embodiment of the present invention.

FIG. 1 shows a simplified block diagram for a secure computer system in accordance with a preferred embodiment of the present invention. In a preferred embodiment of the present invention, system 100 includes host processor 105, host bridge 110, bridge 125, memory 130, devices 115–117, reset control module 140, power transient detector 145, and bus access monitor (BAM) 200. Preferably, BAM 200 provides isolation between trusted bus 101 and untrusted bus 102 by controlling bridge 125.

In another embodiment, without BAM 200, trusted bus 101 and untrusted bus 102 are preferably considered the same bus. In other words, bridge 125 electrically and mechanically extends trusted bus 101 to untrusted bus 102 without isolating communication between them.

System 100 primarily includes host processor 105 for transmitting a datum to trusted bus 101. Host processor 105 preferably transmits data to and receives data from trusted bus 101 via host bridge 110. However, for purposes of the present invention, host bridge 110 is considered a pass through element; therefore host processor 105 is effectively coupled to trusted bus 101.

In a preferred embodiment, host processor 105 is a microprocessor. Preferably, host processor 105 performs software programs that are stored in memory 130. Host processor 105 preferably performs software programs such as management functions for classified databases, word processing programs for unclassified documents, etc. In other embodiments host processor 105 is a reduced instruction set computer (RISC) processor or some other type of processor.

Host bridge 110 is preferably a pass through element. Host bridge 110 is logic designed to interface a processor such as host processor 105 to trusted bus 101. An example of host bridge 110 is a host PCI bridge that couples a host processor to a PCI bus.

Memory 130 is coupled to trusted bus 101 and primarily stores software programs and data for host processor 105. In a preferred embodiment, memory 130 is random access memory (RAM), although other types of memory such as flash memory, read only memory (ROM), bubble memory, magnetic tape, digital video disc (DVD), etc., are possible.

Devices 115–117 are preferably PCI devices. Some examples of PCI devices are: modems, extended memory cards, sound cards, multi-function input/output (I/O) cards, network cards, etc. In a preferred embodiment, device 115 is coupled to trusted bus 101, and devices 116–117 are coupled to untrusted bus 102.

Reset control module 140 is preferably logic that accepts an external reset signal 107 and supplies reset signal 202 to BAM 200.

Power transient detector 145 is preferably circuitry that accepts and monitors power signal 109 from the power supply (not shown). Power transient detector 145 sends signal 103 to BAM 200 when power levels are detected above range and below an acceptable operating range for system 100 elements.

Bridge 125 primarily couples trusted bus 101 to untrusted bus 102. Bridge 125 preferably conveys data from the trusted bus 101 to the untrusted bus 102 and visa versa.

Bus access monitor (BAM) 200 is preferably coupled to trusted bus 101 and untrusted bus 102. BAM 200 is also coupled to host processor 105 via interrupt signal 209. In a preferred embodiment, BAM 200 is connected in parallel with bridge 125. Bus access monitor 200 primarily detects when data is communicated from trusted bus 101 to untrusted bus 102. BAM 200 asserts alarm signal 203 and interrupt signal 209 when address information associated with a datum fails to compare to predetermined address information.

Figure 2:
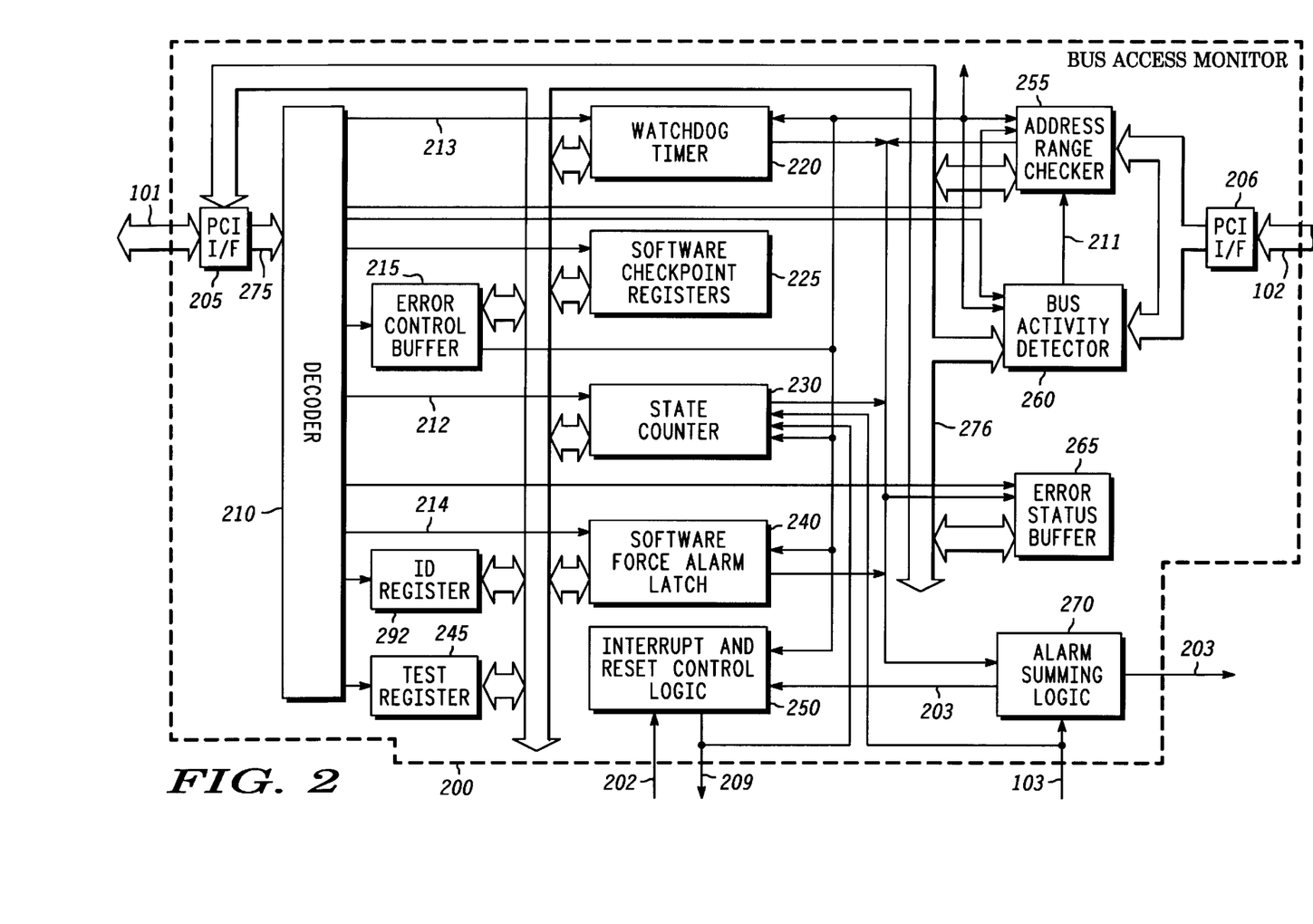
FIG. 2 shows a simplified block diagram for a bus access monitor in accordance with a preferred embodiment of the present invention.

FIG. 2 shows a simplified block diagram for a bus access monitor in accordance with a preferred embodiment of the present invention. In a preferred embodiment, bus access monitor (BAM) 200 generally includes interfaces 205–206, decoder 210, error control buffer 215, identification (ID) register 292, test register 245, watchdog timer 220, software checkpoint registers 225, state counter 230, software force alarm latch 240, interrupt and reset control logic (IRCL) 250, address range checker 255, bus activity detector 260, error status buffer 265, and alarm summing logic (ASL) 270.

Interface (I/F) 205 is coupled to trusted bus 101. In a preferred embodiment, I/F 205 couples BAM 200 to trusted bus 101. Host processor 105 generates signals on trusted bus 101. I/F 205 receives these signals from trusted bus 101 and generates data and clock signals 276 and decoder signals 275. Data and clock signals 276 represent data to and from host processor 105 and clock signals from system 100 respectively. Decoder signals 275 represent address information that is received by decoder 210. Each element for BAM 200 is preferably coupled to data and clock signals 276 except IRCL 250, ASL 270, and interface (I/F) 206.

Decoder 210 decodes signals 275 to determine enable signals for elements for BAM 200. In a preferred embodiment, decoder 210 generates, among other things, self-test complete signal 212, restart timer signal 213, and software force alarm signal 214.

Address range checker (ARC) 255 is coupled to I/F 205 via signals 276. ARC 255 is also coupled to untrusted bus 102 via I/F 206. In a preferred embodiment, host processor 105 predetermines address information for ARC 255. ARC 255 receives predetermined address information that represents memory mapped input/output (I/O) for devices 116–117. ARC 255 monitors address information conveyed to untrusted bus 102 to determine when the address information fails to compare with the predetermined address information. In a preferred embodiment, ARC 255 detects address information that fails to compare with predetermined address information, and ARC 255 asserts alarm signal 203.

Bus activity detector (BAD) 260 receives address information from untrusted bus 102 via I/F 206. When enabled during a self-test operation, for example, BAD 260 asserts detected signal 211 when address information or data is detected on untrusted bus 102. In a preferred embodiment, BAD 260 is enabled during self-test operations for BAM 200 and disabled during monitoring operations performed by BAM 200. In another embodiment, BAD 260 is enabled during monitoring operations performed by ARC 255 and BAD 260 asserts detected signal 211 when address information is present on untrusted bus 102.

State counter 230 is a counter. State counter 230 receives clock signals 276 via I/F 205 and self-test complete signal 212 via decoder 210. State counter 230 receives first and second clock signals 276 and generates internal timing pulses representing a starting time and an ending time (e.g., self-test complete window) during which self-test complete signal 212 is preferably received from host processor 105. The clock for system 100 is not shown but is preferably the system clock. State counter 230 counts clock signals from the system clock. In a preferred embodiment, when IRCL 250 receives a power-on reset signal, state counter 230 is signaled to begin a counting operation. State counter 230 inhibits alarm signal 203 when self-test complete signal 212 is received after the first clock signal (e.g., a first number of clock cycles) and before the second clock signal (e.g., a second number of clock cycles). In a preferred embodiment, host processor 105 generates self-test complete signal 212 when a set of predetermined self-tests for BAM 200 are complete (discussed below).

Watchdog timer 220 is a timer. Watchdog timer 220 is coupled to I/F 205 and receives restart timer signal 213 via decoder 210. Host processor 105 periodically asserts restart timer signal 213 to prevent watchdog timer 220 from asserting alarm signal 203 when the timer expires. Host processor 105 preferably loads watchdog timer 220 with a predetermined countdown value prior to starting the timer. Watchdog timer 220 preferably retains the predetermined countdown value until host processor 105 loads a new predetermined countdown value.

Software force alarm latch (SFAL) 240 is a latch. In a preferred embodiment, SFAL 240 is coupled to I/F 205 and receives software force alarm signal 214 via decoder 210. When software force alarm signal 214 is asserted, SFAL 240 latches the signal. In a preferred embodiment, when SFAL 240 latches software force alarm signal 214, alarm signal 203 is asserted. In a preferred embodiment, host processor 105 controls decoder 210 to assert software force alarm signal 214 when forcing an alarm condition in BAM 200.

Alarm summing logic (ASL) 270 is summing logic. In a preferred embodiment, ASL 270 receives signals from watchdog timer 220, state counter 230, software force alarm latch 240, address range checker 255, and power transient detector 145. Preferably, when one of these elements asserts an alarm signal, ASL 270 asserts alarm signal 203.

Interrupt and reset control logic (IRCL) 250 is logic for generating interrupt and reset signals. In a preferred embodiment, IRCL 250 generates interrupt signal 209 when ASL 270 asserts alarm signal 203. Interrupt signal 209 couples IRCL 250 to host processor 105 and state counter 230. Host processor 105 preferably performs an interrupt service routine (e.g., software/firmware program) when IRCL 250 asserts interrupt signal 209. State counter 230 is preferably restarted when interrupt signal 209 is asserted.

Error control buffer (ECB) 215 is a buffer that is coupled to I/F 205 and decoder 210. ECB 215 receives signals from decoder 210 and generates reset signals. In a preferred embodiment, ECB generates signals that reset "error" latches for watchdog timer 220, state counter 230, SFAL 240, IRCL 250, and ARC 255. Preferably, host processor 105 asserts bits in ECB 215 to individually reset elements.

In a preferred embodiment, identification (ID) register 292 is a register that stores the device identifier for BAM 200. For example, when trusted bus 101 represents a PCI bus, ID register 292 stores the PCI device identifier for BAM 200.

In a preferred embodiment, test register 245 is a thirty-two bit register. Preferably, host processor 105 loads values to and retrieves values from test register 245 to verify communication with BAM 200.

Error status buffer (ESB) 265 is a buffer coupled to I/F 205 and error latches for: watchdog timer 220, state counter 230, SFAL 240, and ARC 255. ESB 265 receives error signals from each element. In a preferred embodiment, ESB 265 stores error signals for each latch so that host processor 105 can associate an element with alarm signal 203 when the alarm signal is asserted.

In a preferred embodiment, software checkpoint registers (SCRs) 225 are redundant registers for storing information. For example, when host processor 105 stores a predetermined value in SCRs 225. At a later time, after performing instructions from a software program, host processor retrieves a value from at least one of SCRs 225. Host processor 105 compares the predetermined value to the value retrieved from SCRs 225. When the values fail to compare, host processor 105 preferably signals BAM 200 to inhibit bridge 125.

Figure 3:
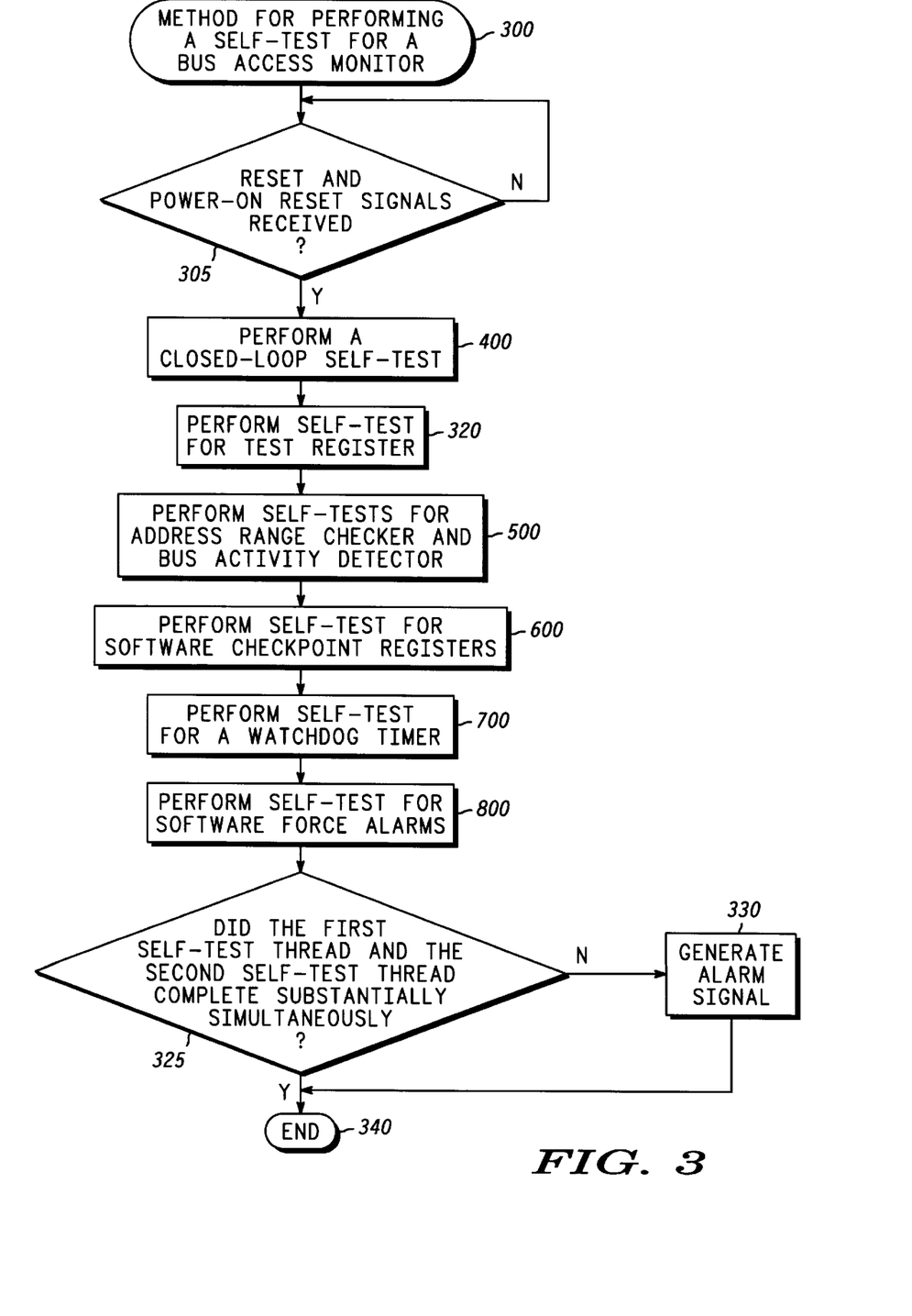
FIG. 3 shows a simplified flowchart for a method for self-testing a bus access monitor in accordance with a preferred embodiment of the present invention.

FIG. 3 shows a simplified flowchart for a method for self-testing a bus access monitor in accordance with a preferred embodiment of the present invention. In a system where security for data is significant, it is important to assure the integrity of an apparatus that enforces security. BAM 200 is a security apparatus for monitoring activity on a bus. In a preferred embodiment, method 300 is performed for self-testing BAM 200. Preferably, host processor 105 controls BAM 200 when performing method 300.

In step 305, a check is performed to determine when reset and power-on reset signals are received. In a preferred embodiment, when a BAM receives reset and power-on reset signals, method 400 is performed. When reset and power-on reset signals fail to be received, the BAM waits for the signals.

Figure 4:
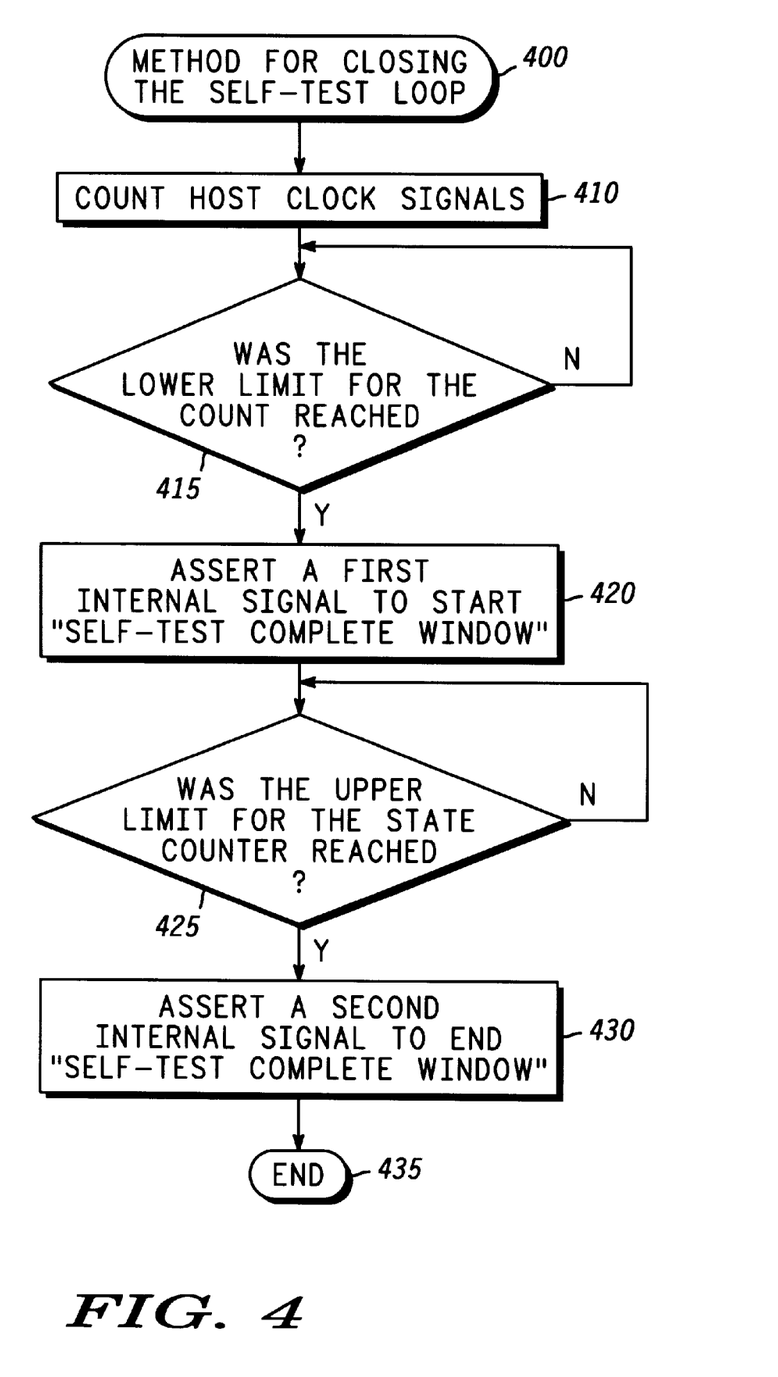
FIG. 4 shows a simplified flowchart for a method for closing a self-test loop in accordance with a preferred embodiment of the present invention.

In method 400, a closed-loop self-test is performed. In a preferred embodiment, method 400 is discussed below. Method 400 is preferably referred to as a first self-test thread. The first self-test thread is preferably performed substantially simultaneously to a second self-test thread (discussed below).

In step 320, a self-test for a test register is performed. In a preferred embodiment, a host processor stores a value in a test register, then the value is retrieved by the host processor. When the value stored in the test register is the same value retrieved from the test register, method 500 is performed. Otherwise, the host processor generates an alarm signal.

Figure 5:
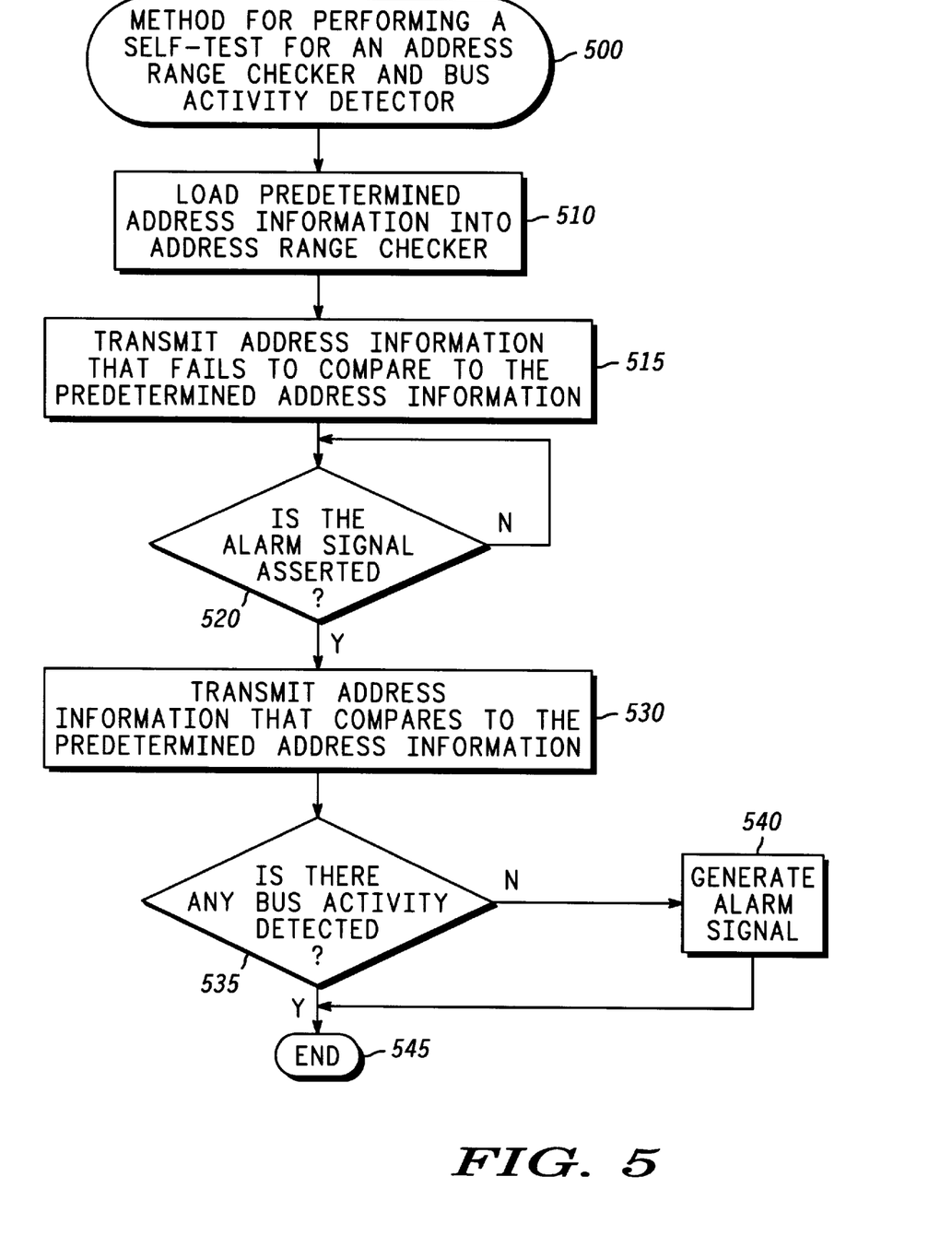
FIG. 5 shows a simplified flowchart for a method for performing self-tests for an address range checker and a bus activity detector in accordance with a preferred embodiment of the present invention.

In method 500, self-tests for an address range checker and a bus activity detector are performed. In a preferred embodiment, method 500 is discussed below.

Figure 6:
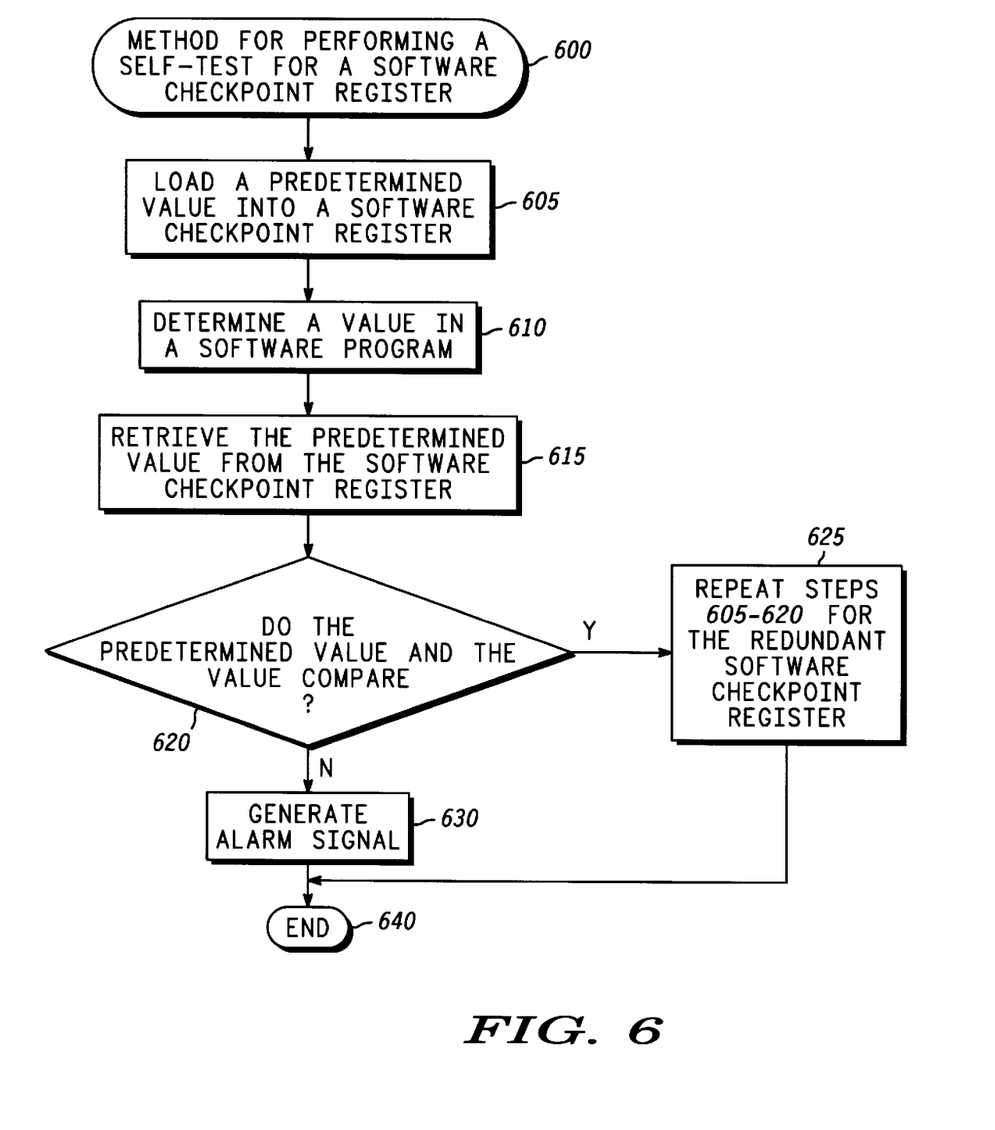
FIG. 6 shows a simplified flowchart for a method for performing a software checkpoint register self-test in accordance with a preferred embodiment of the present invention.

In method 600, a self-test for software checkpoint registers is performed. In a preferred embodiment, method 600 is discussed below.

Figure 7:
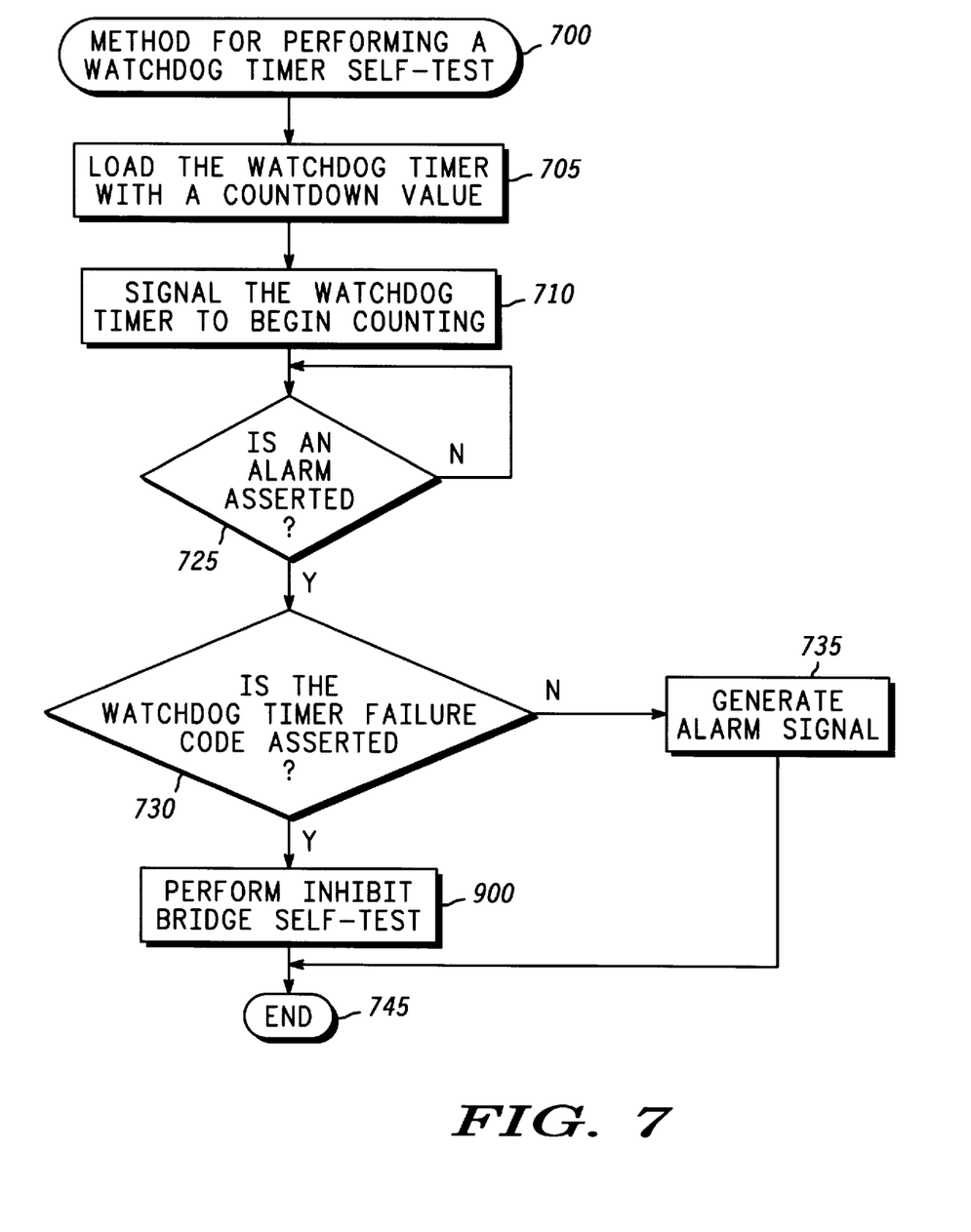
FIG. 7 shows a simplified flowchart for a method for performing a watchdog timer self-test in accordance with a preferred embodiment of the present invention.

In method 700, a self-test for a watchdog timer is performed. In a preferred embodiment, method 700 is discussed below.

Figure 8:
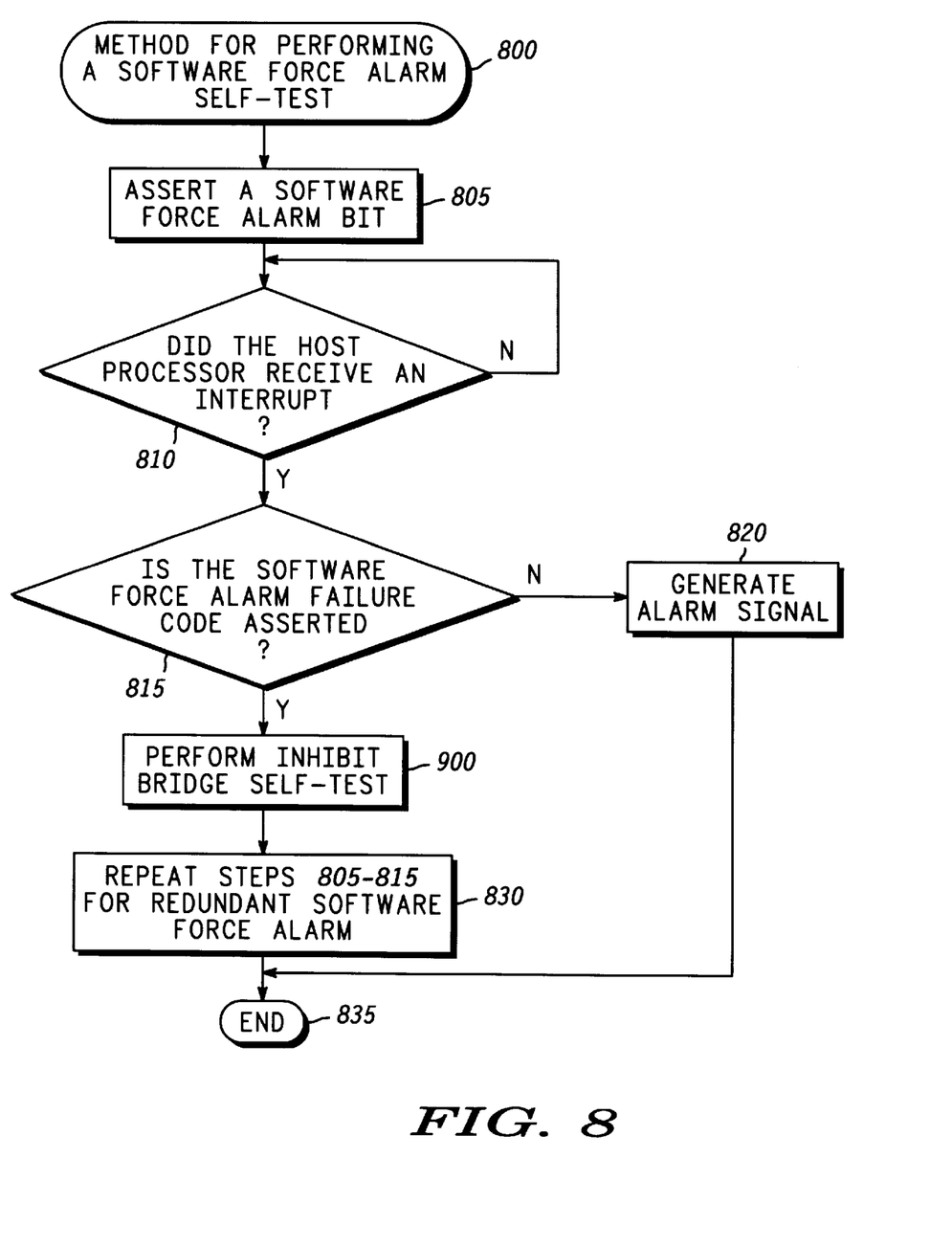
FIG. 8 shows a simplified flowchart for a method for performing a software force alarm self-test in accordance with a preferred embodiment of the present invention.

In method 800, a self-test for software force alarms is performed. In a preferred embodiment, method 800 is discussed below.

In step 325, a check is performed to determine when a first self-test thread and a second self-test thread complete substantially simultaneously. In a preferred embodiment, method 400 is referred to as the first self-test thread. Also, step 320 and methods 400, 500, 600, 700, and 800 are referred to as the second self-test thread. When the first self-test thread and the second self-test thread complete substantially simultaneously, method 300 ends 340. When the threads fail to complete substantially simultaneously, an alarm signal is generated in step 330, and method 300 ends 340.

In a preferred embodiment, when an alarm signal is generated, the alarm signal continues to be asserted until the alarm condition is cleared by the host processor. Alternatively, when the host processor controls self-tests for a bridge access monitor and an alarm signal fails to be asserted when expected, the host processor continuously forces an alarm (e.g., software force alarm).

FIG. 4 shows a simplified flowchart for a method for closing a self-test loop in accordance with a preferred embodiment of the present invention. In a preferred embodiment, upon receiving reset and power-on reset signals in step 305, a state counter begins a count of host clock signals in step 410. In step 415, the state counter checks to determine when a predetermined lower limit for clock signals is reached. When the lower limit fails to be reached, step 415 is repeated. When the lower limit is reached, step 420 is performed.

In step 420, the state counter asserts a first internal signal to start a "self-test complete window".

In step 425, the state counter performs a check to determine when an upper limit for clock signals is reached. When the upper limit fails to be reached, step 425 is repeated. When the upper limit is reached, step 430 is performed.

In step 430, the state counter asserts a second internal signal to end the self-test complete window. In a preferred embodiment, when state counter 230 receives an external signal after the first internal signal (step 420) but before the second internal signal (step 430), the state counter inhibits an alarm signal. Otherwise, the state counter asserts an alarm signal.

FIG. 5 shows a simplified flowchart for a method for performing self-tests for an address range checker and a bus activity detector in accordance with a preferred embodiment of the present invention. In a preferred embodiment, self-tests for the address range checker (ARC) and the bus activity detector (BAD) are performed as a single test; however, in another embodiment, a self-test for each element is performed independently.

In step 510, predetermined address information is loaded into the address range checker. In a preferred embodiment, a host processor loads predetermined address information into the ARC. Preferably, the predetermined address information represents memory mapped I/O address space for devices coupled to an untrusted bus.

In step 515, address information that fails to compare to the predetermined address information is transmitted. In a preferred embodiment, the host processor transmits a datum to a device that has a memory mapped I/O address that fails to be within the range for predetermined address information.

In step 520, the host processor waits for an alarm signal to be asserted. In a preferred embodiment, the host processor waits for the ARC to generate an alarm signal. Step 520 is preferably repeated until an alarm signal is asserted. When an alarm signal is detected, step 530 is performed. In another embodiment, the host processor reads the error status buffer to determine when an alarm signal is asserted. The another embodiment is preferred when strict timing considerations are important for self-testing a BAM.

In a preferred embodiment, step 520 includes clearing the alarm signal by loading a "clear" value into the error control buffer.

In step 530, address information that compares to the predetermined address information is transmitted. In a preferred embodiment, the host processor transmits a datum to a device that has a memory mapped I/O address that is within the range for the predetermined address information.

In step 535, a check is performed to determine when bus activity is detected. In a preferred embodiment, the host processor checks the ARC to verify that the activity detected signal for the BAD is asserted. When the activity detected signal fails to be asserted, an alarm signal is generated in step 540. Otherwise, the method ends 545.

FIG. 6 shows a simplified flowchart for a method for performing a software checkpoint register self-test in accordance with a preferred embodiment of the present invention. In a preferred embodiment, method 600 is performed to self-test a software checkpoint register and a redundant software checkpoint register.

In step 605, a predetermined value is loaded into a software checkpoint register. In a preferred embodiment, the host processor performs a first software program to create a predetermined value. The predetermined value is loaded into a software checkpoint register.

In step 610, a value is determined in a software program. In a preferred embodiment, a second software program determines a value. Preferably, the predetermined value and the value compute to the same value.

In step 615, the predetermined value is retrieved from the software checkpoint register. In a preferred embodiment, the second software program retrieves the predetermined value from the software checkpoint register.

In step 620, a check is performed to compare the predetermined value and the value. In a preferred embodiment, when the values compare, step 625 is performed. Otherwise, step 630 is performed.

In step 625, steps 605–620 are repeated for the redundant software checkpoint register. When step 625 completes, the method ends 640.

In step 630, an alarm signal is generated. In a preferred embodiment, the host processor generates an alarm signal via the software force alarm latch for the bus access monitor. Then, the method ends 640.

FIG. 7 shows a simplified flowchart for a method for performing a watchdog timer self-test in accordance with a preferred embodiment of the present invention. In a preferred embodiment, method 700 is performed to self-test a watchdog timer.

In step 705, the watchdog timer is loaded with a countdown value. In a preferred embodiment, the host processor loads the watchdog timer with a predetermined countdown value. Preferably, a "small" value is loaded into the watchdog timer so that the timer will expire in a short time period.

In step 710, the watchdog timer is signaled to begin counting. In a preferred embodiment, the host processor asserts the restart watchdog timer signal to start the watchdog timer.

In step 725, a wait step is performed until an alarm signal is asserted. In a preferred embodiment, the host processor waits for an alarm signal from the bus access monitor. When no alarm signal is asserted, step 725 is repeated. Otherwise, step 730 is performed.

In step 730, a check is performed to determine when the watchdog timer failure code is asserted. In a preferred embodiment, the host processor retrieves the failure codes from the error status buffer to determine when the watchdog failure code is asserted. When the failure code fails to be asserted, the host processor generates an alarm signal in step 735. Otherwise, method 900 is performed.

Figure 9:
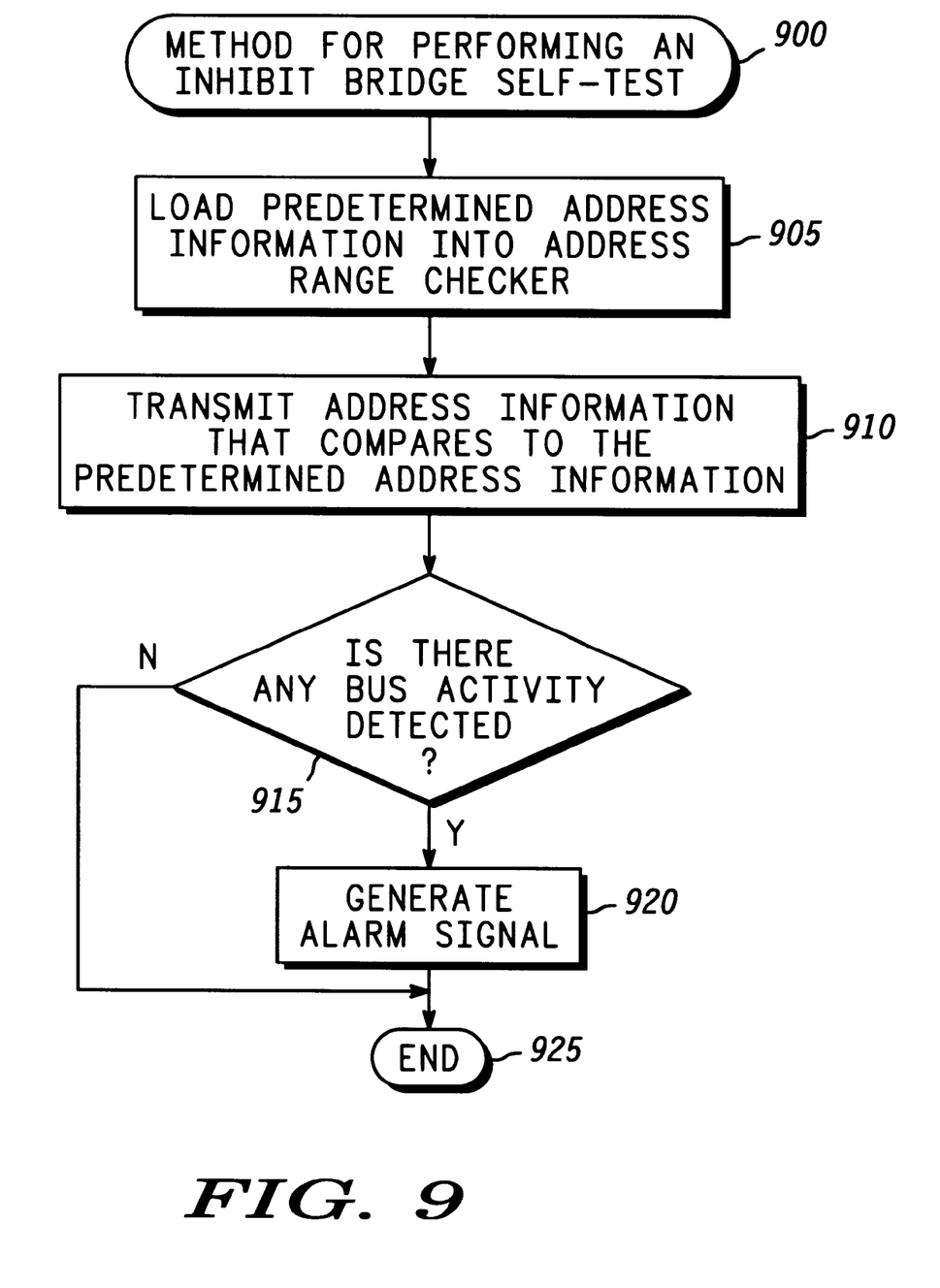
FIG. 9 shows a simplified flowchart for a method for performing an inhibit bridge self-test in accordance with a preferred embodiment of the present invention.

In method 900, an inhibit bridge self-test is performed. Method 900 is discussed below.

FIG. 8 shows a simplified flowchart for a method for performing a software force alarm self-test in accordance with a preferred embodiment of the present invention. In a preferred embodiment, method 800 is performed to self-test a software force alarm.

In step 805, a software force alarm bit is asserted. In a preferred embodiment, the host processor loads a bit into the software force alarm latch.

In step 810, a wait step is performed until the host processor receives an interrupt. In a preferred embodiment, when no interrupt is received, step 810 is repeated. When an interrupt is received, step 815 is performed.

In step 815, a check is performed to determine when a software force alarm failure code is asserted. In a preferred embodiment, the host processor retrieves the failure codes from the error status buffer to determine when the software force alarm failure code is asserted. When the failure code fails to be asserted, the host processor generates an alarm signal in step 820. Otherwise, method 900 is performed.

In method 900, an inhibit bridge self-test is performed. Method 900 is discussed below.

In step 830, steps 805–815 are performed for the redundant software force alarm.

FIG. 9 shows a simplified flowchart for a method for performing an inhibit bridge self-test in accordance with a preferred embodiment of the present invention. In a preferred embodiment, method 900 is performed to self-test a bridge when the bridge is inhibited from conveying data from a trusted bus to an untrusted bus.

In step 905, predetermined address information is loaded into the address range checker. In a preferred embodiment, step 905 is performed similar to step 510 (FIG. 5).

In step 910, address information that compares to the predetermined address information is transmitted. In a preferred embodiment, step 910 is performed similar to step 530 (FIG. 5).

In step 915, a check is performed to determine when bus activity is detected. In a preferred embodiment, the host processor checks the ARC to verify that the activity detected signal for the BAD is asserted. When the activity detected signal fails to be asserted, an alarm signal is generated in step 920. Otherwise, the method ends 925.

Figure 10:
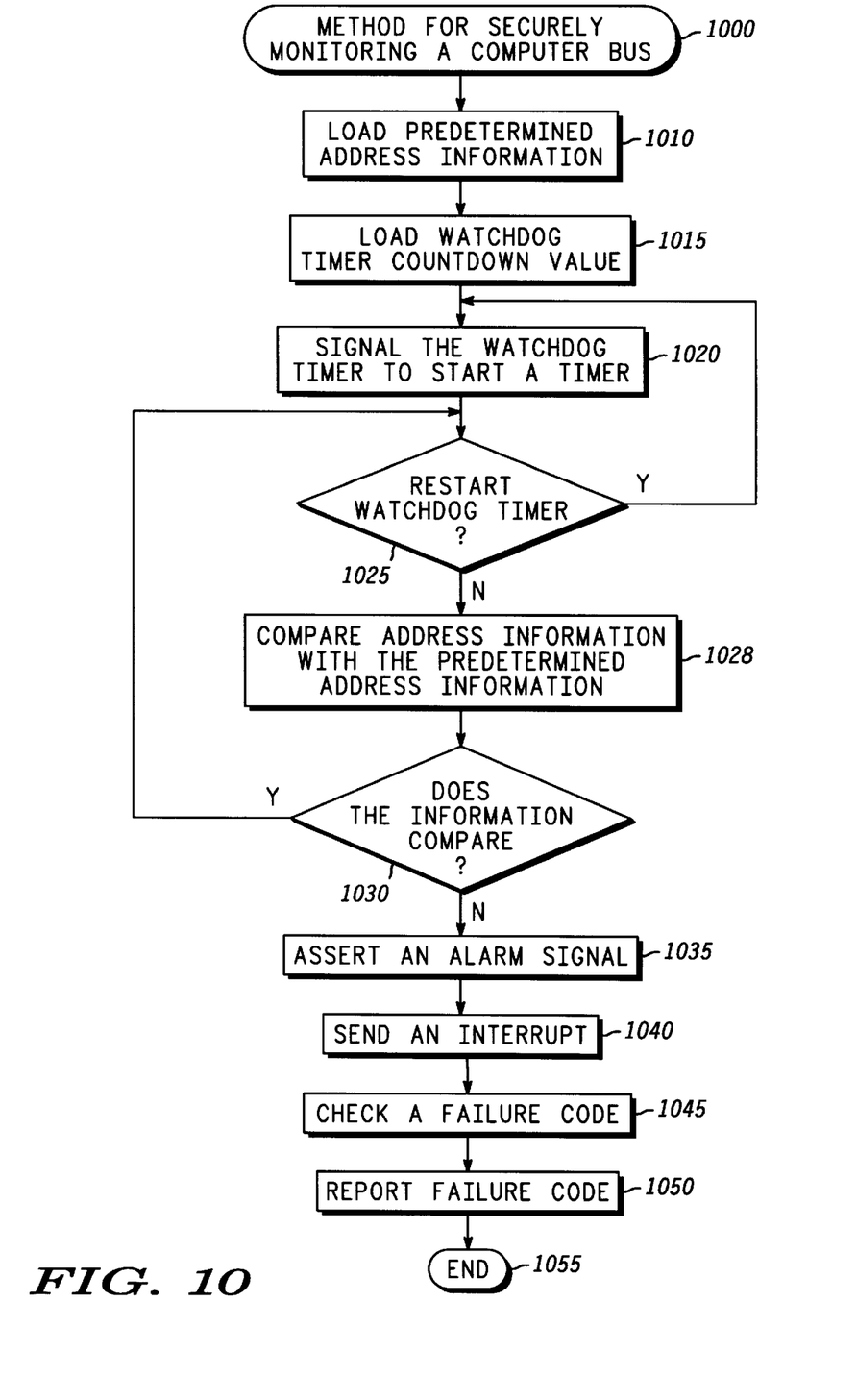
FIG. 10 shows a simplified flowchart for a method for securely monitoring a computer bus in accordance with a preferred embodiment of the present invention.

FIG. 10 shows a simplified flowchart for a method for securely monitoring a computer bus in accordance with a preferred embodiment of the present invention. In a preferred embodiment, method 1000 is primarily performed to monitor an untrusted bus for address information that fails to compare with predetermined address information. When address information fails to compare, a bus access monitor inhibits a bridge from conveying a datum from a trusted bus to an untrusted bus. In another embodiment, method 1000 is primarily performed to monitor a trusted computer bus.

In step 1010, predetermined address information is loaded into an ARC. In a preferred embodiment, step 1010 is performed similar to step 510.

In step 1015, the watchdog timer is loaded with a countdown value. In a preferred embodiment, the host processor loads the watchdog timer with a predetermined countdown value.

In step 1020, the watchdog timer is signaled to begin counting. In a preferred embodiment, the host processor asserts the restart watchdog timer signal to start the watchdog timer.

In step 1025, a check is performed to determine when the watchdog timer needs to be restarted. In a preferred embodiment, the host processor periodically restarts the watchdog timer by reasserting the restart watchdog timer signal. When step 1025 fails to be performed, the watchdog timer asserts an alarm signal. When the watchdog timer needs restarted, step 1020 is performed. Otherwise, step 1028 is performed.

In step 1028, address information is compared with the predetermined address information.

In step 1030, a check is performed to determine when the information compares. In a preferred embodiment, when the address information compares, step 1025 is performed. Otherwise, step 1035 is performed.

In step 1035, an alarm signal is asserted. In a preferred embodiment, when the address information fails to compare with the predetermined address information, the ARC asserts an alarm signal. Preferably, when an alarm signal is asserted, the BAM inhibits the bridge from conveying data and address information from the trusted bus to the untrusted.

In a preferred embodiment, redundant alarm signals (e.g., alarm signals 203, FIG. 2) are asserted. For example, one alarm signal is asserted at a bridge reset input for the bridge and another alarm signal is asserted at an output disable for the bridge.

In step 1040, an interrupt is sent to the host processor. In a preferred embodiment, when the alarm signal is asserted by the ASL, the IRCL sends an interrupt to the host processor.

In step 1045, a failure code is checked to determine a source for the alarm signal. In a preferred embodiment, the host processor checks the error status buffer to determine the source for the alarm signal.

In step 1050, the failure code is reported. In a preferred embodiment, the host processor reports the failure code determined in step 1045. In an embodiment having a display device, the failure code is reported to the display device. In another embodiment, the failure code is saved in memory.

Thus, among other things, what has been shown are a system and method providing security protection for communications via a bus for a computer. What has also been shown are a system and method for isolating devices coupled to a computer bus. What has also been shown are a system and method for detecting communication of data from one device to another device. What has also been shown are a system and method for inhibiting communication of data from one device to another device. What has also been shown are a system and method for self-testing a security apparatus providing security protection.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims

What is claimed is:

1. A secure computer system comprising:
   a host processor for transmitting a datum to a trusted bus;
   a bridge for connecting the trusted bus to an untrusted bus, the bridge conveying the datum from the trusted bus to the untrusted bus; and
   a bus access monitor coupled to the untrusted bus, the bus access monitor detecting when the datum is conveyed to the untrusted bus,
   wherein the bus access monitor further comprises an address range checker coupled to the trusted bus, the address range checker generating an alarm signal when address information associated with the datum fails to compare with predetermined address information.

2. A secure computer system as claimed in claim 1, wherein the address range checker asserts a signal to inhibit operation of the bridge when the alarm signal is asserted.

3. A secure computer system as claimed in claim 1, wherein the bus access monitor further comprises a bus activity detector coupled to the untrusted bus, the bus activity detector asserting a detection signal when the datum is detected on the untrusted bus.

4. A secure computer system as claimed in claim 1, wherein the bus access monitor further comprises a state counter coupled to the trusted bus, the state counter receiving first and second clock cycles, the state counter inhibiting a second alarm signal when a self-test complete signal is received after the first clock cycle and before the second clock cycle.

5. A secure computer system as claimed in claim 1, wherein the bus access monitor further comprises a watchdog timer coupled to the trusted bus, the watchdog timer generating a second alarm signal when a restart timer signal fails to be asserted periodically.

6. A secure computer system as claimed in claim 5, wherein the restart timer signal is generated by the host processor.

7. A secure computer system as claimed in claim 1, wherein the bus access monitor further comprises a software force alarm latch coupled to the trusted bus, the software force alarm latch asserting a second alarm signal when a software force alarm signal is received.

8. A secure computer system as claimed in claim 1, wherein the trusted bus is a peripheral component interconnect (PCI) bus.

9. A secure computer system as claimed in claim 1, wherein the untrusted bus is a peripheral component interconnect (PCI) bus.

10. A secure computer system as claimed in claim 1, wherein the bridge is a peripheral component interconnect (PCI) bridge.

11. A bus access monitor comprising:
an interface coupled to a trusted bus, wherein the interface receives a datum and address information associated with the datum;
an address range checker coupled to the interface, the address range checker generating an alarm signal when the address information fails to compare with predetermined address information;
a bus activity detector coupled to an untrusted bus, the bus activity detector asserting a detection signal when the address information is detected on the untrusted bus; and
a state counter coupled to the interface, the state counter receiving first and second clock cycles, the state counter inhibiting a second alarm signal when a self-test complete signal is received after the first clock cycle and before the second clock cycle.

12. A bus access monitor as claimed in claim 11, wherein the address range checker generates the alarm signal when the address information fails to compare with the predetermined address information and the detection signal is asserted by the bus activity detector.

13. A bus access monitor as claimed in claim 11, wherein the untrusted bus is a peripheral component interconnect (PCI) bus.

14. A bus access monitor comprising:
an interface coupled to a trusted bus, wherein the interface receives a datum and address information associated with the datum;
an address range checker coupled to the interface, the address range checker generating an alarm signal when the address information fails to compare with predetermined address information;
a bus activity detector coupled to an untrusted bus, the bus activity detector asserting a detection signal when the address information is detected on the untrusted bus; and
a watchdog timer coupled to the interface, the watchdog timer generating a second alarm signal when a restart timer signal fails to be periodically asserted to the watchdog timer.

15. A bus access monitor comprising:
an interface coupled to a trusted bus, wherein the interface receives a datum and address information associated with the datum;
an address range checker coupled to the interface, the address range checker generating an alarm signal when the address information fails to compare with predetermined address information;
a bus activity detector coupled to an untrusted bus, the bus activity detector asserting a detection signal when the address information is detected on the untrusted bus; and
a software force alarm latch coupled to the interface, the software force alarm latch asserting a second alarm signal when a software force alarm signal is received.

16. A bus access monitor as claimed in claim 11, wherein the trusted bus is a peripheral component interconnect (PCI) bus.

17. A method for securely monitoring a computer bus, the method comprising the steps of:
loading predetermined address information into a bus access monitor;
comparing address information conveyed to the computer bus with the predetermined address information;
asserting an alarm signal when the address information fails to compare with the predetermined address information; and
sending an interrupt to a host processor when the alarm signal is asserted.

18. A method for securely monitoring a computer bus, the method comprising the steps of:
loading predetermined address information into a bus access monitor;
comparing address information conveyed to the computer bus with the predetermined address information;
asserting an alarm signal when the address information fails to compare with the predetermined address information; and
checking a failure code to determine a source for the alarm signal.

19. A method for securely monitoring a computer bus, the method comprising the steps of:
loading predetermined address information into a bus access monitor;
comparing address information conveyed to the computer bus with the predetermined address information;
asserting an alarm signal when the address information fails to compare with the predetermined address information;
signaling a watchdog timer to start a timer; and
restarting, periodically, the watchdog timer.

20. A method for self-testing a bus access monitor, the method comprising the steps of:
performing a closed-loop self-test to create a first self-test thread;
performing an address range checker self-test to create a second self-test thread, the first and second self-test threads being performed substantially simultaneously; and
generating an alarm signal when the first self-test thread and the second self-test thread fail to complete substantially simultaneously.

21. A method as claimed in claim 20, wherein the second self-test thread further comprises the step of performing a test register self-test to check a read and a write capability for the bus access monitor.

22. A method as claimed in claim 20, wherein the second self-test thread further comprises the step of performing a bus activity detector self-test to generate a second alarm signal when conveyance of a datum from a trusted bus to an untrusted bus fails to be detected.

23. A method as claimed in claim 20, wherein the second self-test thread further comprises the step of performing a watchdog timer self-test to generate a second alarm signal when a watchdog timer expires.

24. A method as claimed in claim 20, wherein the second self-test thread further comprises the step of performing a software force alarm self-test to generate a second alarm signal when the software force alarm latch receives a force alarm signal.

* * * * *